No. 848,031. PATENTED MAR. 26, 1907.
A. HENNIGER.
PENCIL.
APPLICATION FILED JAN. 12, 1905.
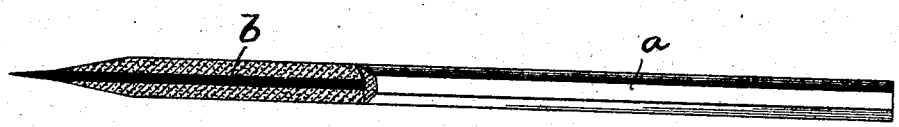
Witnesses
W. H. Crichton, Clarke
J. Richards
Inventor
Adolf Henniger
By Dickerson, Brown, Raegener & Binney
Attys

UNITED STATES PATENT OFFICE.

ADOLF HENNIGER, OF BERLIN, GERMANY.

PENCIL.

No. 848,031.          Specification of Letters Patent.          Patented March 26, 1907.

Application filed January 12, 1905. Serial No. 240,847.

*To all whom it may concern:*

Be it known that I, ADOLF HENNIGER, machinist, a subject of the Emperor of Germany, and residing at 64 Gartenstrasse, Berlin, N., in the German Empire, have invented certain new and useful Improvements in Pencils, of which the following is a specification.

This invention relates to a pencil consisting of a pigment—for instance, graphite—firmly inclosed in a protecting-mantle of an artificially-made solid material.

More particularly, the invention has for its object an improved protecting-mantle of said kind and an improved process of manufacturing same.

My new protecting-mantle for pencils consists of the dry residuum of starch containing parts of vegetables, especially of bulbous plants, such as potatoes, cemented together by some cements and being intermixed with fibrous material. Besides these components the mantle mass may contain other admixtures, such as coloring material or substances, adapted to increase the elasticity of the mass, &c. In order to make the mass somewhat spongy, I may use an addition of starch. However, the contents in starch is generally disadvantageous, in so far as it raises the price of the mass.

If potatoes are used as raw material for my new pencil-protecting mantle, I may proceed as follows: A part of the potatoes, for instance, one-half, is boiled. These potatoes are then squashed into a pulp. Also the raw potatoes are converted into a pulpy mass; but prior to that it is advisable to merely cut them into pieces of a certain size and to expose them to the action of a diluted acid or of alkaline solutions, whereby any bacteria in the same will be killed and may be combinations formed which act as cements. Very good results have been obtained by treating the potato-pieces with four per cent. acetic acid from three to twenty-four hours. However, the concentration of the solution and the duration of treatment may be varied within wide ranges. After the acid treatment the mass is washed out with water. Residues of acid may be neutralized by alkali. Hereafter the potato-pieces are dried and divided into a pulp. To the pulp or powder of boiled and raw potatoes a suitable cement is added—for instance, seven per cent. of ordinary glue—and a few per cent. of a fibrous material—for instance, four per cent. of the waste products of cotton spinning and weaving mills. I also like to add substances adapted to increase the elasticity—for instance, two to three per cent. beeswax. The whole mass is then thoroughly mixed. Thereupon the mixture is compressed and will then form a solid mass of which protecting-mantles for pencils can be made. It is advisable to compress the mass in a somewhat heated condition, as it has been found that the compactness of the same is greater if the compressing takes place at a temperature of about 50° centigrade than in the case of cold pressing. Also the resulting surfaces are smoother, so that a special polishing process may be dispensed with. The forming of the mantle of out the mass is preferably effected simultaneously with the formation of the mass itself by pressing the mixed raw materials (triturated potatoes, glue, and so on) out of a mold in the shape of a hollow rope. Into the hole in the rope the core of the pencil containing the pigment can then be inserted. On the mass getting dry it is so contracted that the core of the pencil is firmly inclosed in the same provided the cross-section of the hole is of a corresponding size.

Instead of glue other binders may be used. Also instead of beeswax resin, grease, or mixtures of these substances or other substances may be used for increasing the elasticity of the mass. Moreover, instead of the said fibrous material wood-pulp or other suitable substances may be used. Instead of the potato mass the mass of other bulbous plants may be used. The use of other parts of plants containing amylum is not excluded either, though thus far potato mass has given the best results and has proved the least expensive. Instead of using parts of plants in their natural state waste products may also be used. Such waste products, for instance, are the residues of distilleries and starch factories. These waste products may also be added to the natural amyleceous parts of plants—for instance, to the potatoes in the above-described process.

The new pencil is illustrated by the accompanying drawing, partly in side elevation and partly in longitudinal section.

The mantle of the pencil is indicated by the reference-letter *a*, and the core by the letter *b*.

What I claim as my invention, and desire to secure by Letters Patent, is—

1. A pencil for writing, drawing and similar purposes comprising a core and a mantle firmly inclosing same, said mantle containing starch containing vegetables in compressed condition preferably in combination with suitable cement and fibrous material.

2. A pencil for writing, drawing and similar purposes comprising a core and a mantle firmly inclosing same, said mantle containing dry residuum of vegetable bulbs in compressed condition preferably in combination with suitable cement and fibrous material.

3. A pencil for writing, drawing and similar purposes comprising a core and a mantle firmly inclosing same, said mantle containing dry residuum of potatoes in compressed condition preferably in combination with suitable cement and fibrous material.

4. A pencil for writing, drawing and similar purposes comprising a core and a mantle firmly inclosing same, said mantle consisting of the compressed substance of potatoes in admixture with vegetable fibers of other origin and cementing material.

5. A pencil for writing, drawing and similar purposes comprising a core and a mantle firmly inclosing same, said mantle consisting of the compressed substance of potatoes in admixture with vegetable fibers of other origin and glue, wax, fat, oil or compounds.

6. A pencil for writing, drawing and similar purposes comprising a core and a mantle firmly inclosing same, said mantle consisting of the compressed substance of potatoes, at least a part of said potatoes being in boiled condition, in admixture with vegetable fibers of other origin and glue, wax, fat, oil or compounds.

In witness whereof I have hereunto set my hand in the presence of two witnesses.

ADOLF HENNIGER.

Witnesses:
HENRY HASPER,
WOLDEMAR HAUPT.